(12) United States Patent
Nysen

(10) Patent No.: US 6,775,616 B1
(45) Date of Patent: Aug. 10, 2004

(54) ENVIRONMENTAL LOCATION SYSTEM

(75) Inventor: Paul A. Nysen, Sunnyvale, CA (US)

(73) Assignee: X-Cyte, Inc., San Jose, CA (US)

( * ) Notice: Subject to any disclaimer, the term of this patent is extended or adjusted under 35 U.S.C. 154(b) by 0 days.

(21) Appl. No.: 10/646,140

(22) Filed: Aug. 20, 2003

Related U.S. Application Data

(63) Continuation of application No. 10/201,025, filed on Jul. 22, 2002, now Pat. No. 6,611,758, which is a continuation of application No. 09/902,073, filed on Jul. 10, 2001, now Pat. No. 6,424,916, which is a continuation of application No. 09/248,023, filed on Feb. 10, 1999, now Pat. No. 6,259,991.

(51) Int. Cl.[7] .............................. G06F 17/00; G01S 5/05
(52) U.S. Cl. ...................... 701/300; 701/207; 701/217; 342/357.09; 340/988
(58) Field of Search ................................ 701/200, 300, 701/217; 340/988, 991, 993, 995.28, 10.1, 10.52, 825.49; 342/357.09, 357.1, 357.13, 357.14, 42, 44, 46, 51

(56) References Cited

U.S. PATENT DOCUMENTS

| | | |
|---|---|---|
| 3,273,146 A | 9/1966 | Hurwitz |
| 3,706,094 A | 12/1972 | Cole et al. |
| 3,755,803 A | 8/1973 | Cole et al. |
| 4,058,217 A | 11/1977 | Vaughan et al. |
| 4,059,831 A | 11/1977 | Epstein |
| 4,484,160 A | 11/1984 | Riha |
| 4,604,623 A | 8/1986 | Skeie |
| 4,605,929 A | 8/1986 | Skeie |
| 4,620,191 A | 10/1986 | Skeie |
| 4,623,890 A | 11/1986 | Nysen |
| 4,625,207 A | 11/1986 | Skeie |
| 4,625,208 A | 11/1986 | Skeie et al. |
| 4,703,327 A | 10/1987 | Rossetti et al. |
| 4,724,443 A | 2/1988 | Nysen |
| 4,725,841 A | 2/1988 | Nysen et al. |
| 4,734,698 A | 3/1988 | Nysen et al. |
| 4,737,789 A | 4/1988 | Nysen |
| 4,737,790 A | 4/1988 | Skeie et al. |
| 4,951,057 A | 8/1990 | Nagel |
| 5,095,240 A | 3/1992 | Nysen et al. |
| 5,182,570 A | 1/1993 | Nysen et al. |
| 6,259,991 B1 | 7/2001 | Nysen |
| 6,424,916 B2 | 7/2002 | Nysen |
| 6,597,983 B2 * | 7/2003 | Hancock ..................... 701/200 |
| 6,611,758 B1 | 8/2003 | Nysen |

* cited by examiner

*Primary Examiner*—Tan Q. Nguyen
(74) *Attorney, Agent, or Firm*—Thelen Reid & Priest LLP

(57) ABSTRACT

A system and method for determining a location. The system employs encoded information devices dispersed through the environment, each having a non-unique code associated therewith. The codes from the encoded information devices are acquired as a reading device passes nearby, and stored. The codes from a proximate set of information devices are correlated with a map or mapping relation to determine one or more consistent positions within the environment. The information devices are preferably passive acoustic wave transponders, and the mapping relation may be a pseudo-random sequence or a defined map.

18 Claims, 10 Drawing Sheets

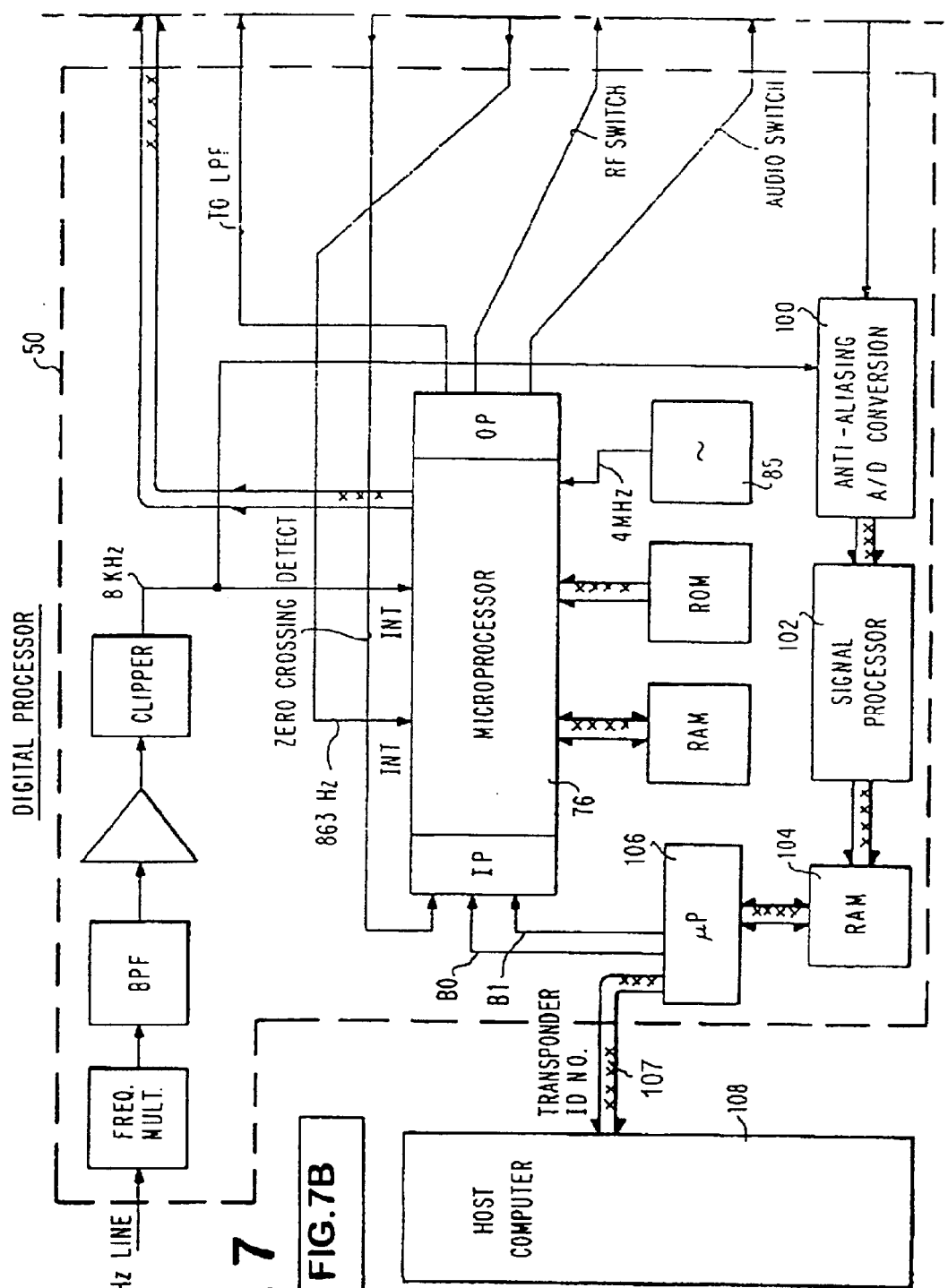

| 3 | 0 | 8 | 6 | 1 | 7 | B | D |
|---|---|---|---|---|---|---|---|
| A | D | 9 | 2 | 5 | 3 | 5 | A |
| 9 | C(D2) | 4 | 8 | 6 | 7 | C | D |
| 2 | 8 | 1 | 9 | 0 | 2 | 1 | 5 |
| 3 | 5 | B | 3 | B(C) | 4 | A | C |
| 0 | 7 | D | 6 | 7 | E | E | 9 |
| 6 | 1 | E | A | 4 | F | 0 | F |
| F | 4 | C(D1) | 2 | E | B | F | 8 |

Fig. 9B

ENVIRONMENTAL LOCATION SYSTEM

The present application is a continuation of U.S. patent application Ser. No. 10/201,025 filed on Jul. 22, 2002, now U.S. Pat. No. 6,611,758, which is a continuation of U.S. patent application Ser. No. 09/902,073 filed on Jul. 10, 2001, now U.S. Pat. No. 6,424,916, which is a continuation of U.S. patent application Ser. No. 09/248,023 filed on Feb. 10, 1999, now U.S. Pat. No. 6,259,991.

FIELD OF THE INVENTION

The present invention relates to method and apparatus for determining a location within an environment, and more particularly to a system which derives information from a plurality of passive devices; each having a predetermined location and communicating insufficient information to define the predetermined location.

BACKGROUND OF THE INVENTION

A known radio frequency passive acoustic transponder system provides a radio-frequency surface acoustic wave on a piezoelectric substrate which interacts with elements on the substrate to produce an individualized complex waveform response to an interrogation signal. The code space for these devices may be, for example, $2^{16}$ codes, or more, allowing a large number of transponders to be produced without code reuse. These devices consist of a piezoelectric substrate on which a metallized conductor pattern is formed, for example by a typical microphotolithography process, with a minimum feature size of, for example, one micron, and appropriate antennas and mechanical enclosures. The acoustic wave mode is often a surface acoustic wave (e.g., a Rayleigh wave), although acoustic wave devices operating with different wave types are known.

The known transponder devices thus include a surface acoustic wave device, in which an identification code is presented as a characteristic time-domain delay pattern in signal retransmitted from the transponder. Typical systems generally require that the signal emitted from an exciting antenna be non-stationary with respect to a signal received from the tag. This ensures that the reflected signal pattern is easily distinguished from the emitted signal during the entire duration of the retransmitted signal return, representing a plurality of internal states of the transponder, allowing analysis of the various delay components within the device.

In such a device, received RF energy is transduced onto a piezoelectric substrate as an acoustic wave with a first interdigital electrode system, from whence it travels through the substrate, interacting with reflector, delay or resonant/frequency selective elements in the path of the acoustic wave, resulting in specific known electro-acoustic interactions. A portion of the acoustic wave energy is ultimately received an interdigital electrode system and retransmitted. The retransmitted signal thus represents a complex delay and attenuation pattern function of the emitted signal, and a receiver is provided which analyzes the delay and perturbation pattern to characterize the system which produced it; thus identifying the device.

These devices do not require a semiconductor memory nor external electrical energy storage system, e.g., battery or capacitor, to operate. The propagation velocity of an acoustic wave in such a surface acoustic wave device is slow as compared to the free space propagation velocity of a radio wave. Thus, the time for transmission between the radio frequency interrogation system and the transponder is typically short as compared to the acoustic delay intrinsic to the device, so that an allowable rate of the interrogation frequency change is based on the delay characteristics within the transponder. The interrogation frequency is controlled to change by a sufficient amount so that the shortest possible delay path of a return signal may be distinguished from the simultaneous interrogation frequency, and so that all of the relevant delays are unambiguously received for analysis. Further, the interrogation frequency should not return to the same frequency before a maximum delay period, thus preventing ambiguity or aliasing. Generally, such systems are interrogated with a pulse transmitter or chirp frequency system.

Systems for interrogating a passive transponder employing acoustic wave devices, carrying amplitude and/or phase-encoded information are disclosed in, for example, U.S. Pat. Nos. 4,059,831; 4,484,160; 4,604,623; 4,605,929; 4,620,191; 4,623,890; 4,625,207; 4,625,208; 4,703,327; 4,724,443; 4,725,841; 4,734,698; 4,737,789; 4,737,790; 4.951,057; 5,095,240; and 5,182,570, expressly incorporated herein by reference. Other passive interrogator label systems are disclosed in the U.S. Pat. Nos. 3,273,146; 3,706,094; 3,755,803; and 4,058,217.

In its simplest form, the acoustic transponder systems disclosed in these patents include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of an electrical signal corresponding to the RF interrogation wave, an acoustic wave is generated within the piezoelectric material and transmitted along a defined acoustic path. This acoustic wave may be modified along its path, such as by reflection, attenuation, variable delay (phase shift), and interaction with other transducers or resonators.

When an acoustic wave pulse is reconverted into an electrical signal, it is supplied to an antenna on the transponder and transmitted as RF electromagnetic energy. The signal may be reflected back alone its incident path, and thus a single antenna and transducer may be provided, for both receiving and emitting Radio Frequency energy. This energy is received at a receiver and decoder, typically at or near the same location as the interrogating transmitter, and the information contained in this response to an interrogation signal is decoded. Designs are known, with unitary and separate receiving and transmitting antennas, which may be at the same frequency or harmonically related, and having the same or different polarization.

In systems of this general type, the information code associated with and which identifies the passive transponder is built into the transponder at the time that the metallization pattern is finally defined on the substrate of piezoelectric material. This metallization also typically defines the antenna coupling, launch transducers, acoustic pathways and information code elements, e.g., reflectors. Thus, the information code in this case is non-volatile and permanent. The information is present in the return signal as a set of characteristic perturbations of the interrogation signal, such as a specific complex delay pattern and attenuation characteristics. In the case of a transponder tag having launch transducers and a variable pattern of reflective elements, the number of possible codes is $N \times 2^M$ where N is the number of acoustic waves launched by the transducers (path multiplicity) and M is the number of reflective element positions for each transducer (codespace complexity). Thus, with four launch transducers each emitting two acoustic waves (forward and backward) (N=8), and a potential set of eight (M=8) variable reflective elements in each acoustic path, the number of differently coded transducers is 2048. Therefore, for a large number of potential codes, it is necessary to provide a large number of launch transducers and/or a large number of reflective elements. However, efficiency is lost with increasing complexity, and a large number of distinct acoustic waves reduces the signal strength of the signal encoding the information in each. Therefore, the transponder design is a tradeoff between device codespace complexity and efficiency.

Typically, the sets of reflective elements in each path form a group, having a composite transfer function, while each group, representing different acoustic paths, has a different characteristic timing, allowing the various group responses to be distinguished.

The transponder tag thus typically includes a multiplicity of "signal conditioning elements", i.e., delay elements, reflectors, and/or amplitude modulators, which are coupled to receive the first signal from a transponder antenna. Each signal conditioning element provides an intermediate signal having a known delay and a known amplitude modification to the acoustic wave interacting with it. Even where the signal is split into multiple portions, it is advantageous to reradiate the signal through a single antenna. Therefore, a single "signal combining element" coupled to the all of the acoustic waves, which have interacted with the signal conditioning elements, is provided for combining the intermediate signals to produce the radiated transponder signal. The radiated signal is thus a complex composite of all of the signal modifications, which may occur within the transponder, of the interrogation wave.

In known passive acoustic transponder systems, the transponder remains static over time, so that the encoded information is retrieved by a single interrogation cycle, representing the state of the tag, or more typically, obtained as an inherent temporal signature of an emitted signal due to internal time delays. In order to determine a transfer function of a passive transponder device, the interrogation cycle may include measurements of excitation of the transponder at a number of different frequencies. This technique allows a frequency domain analysis, rather than a time domain analysis of an impulse response of the transponder. Essentially, the composite response of M signal conditioning elements within the transponder tag are evaluated at at least M different frequencies, allowing characterization of the group of elements. Displaced in time from each other, N groups of elements may be analyzed during the same interrogation sequence.

Typically, the interrogator transmits a first signal having a first frequency that successively assumes a plurality of frequency values within a prescribed frequency range. This first frequency may, for example, be in the range of 905–925 MHz, referred to herein as the nominal 915 MHz band, a frequency band that is commonly available for such use. The response of the tag to excitation varies with frequency, due to the fixed time delays and attenuation. In some known systems, the excitation frequency changes over time, so that the retransmitted response, due to the acoustic propagation delay of the tag, is at a different frequency than the simultaneously emitted signal, thus providing a retransmitted signal removed slightly from the emitted signal, so that when cross-modulated, the resulting signal is near baseband, but not DC.

Preferably, the passive acoustic wave transponder tag includes at least one element having predetermined characteristics, which assist in synchronizing the receiver and allows for temperature compensation of the system. As the temperature changes, the piezoelectric substrate may expand and contract, altering the characteristic delays and other parameters of the tag. Variations in the transponder response due to changes in temperature thus result, in part, from the thermal expansion of the substrate material. Although propagation distances are small, an increase in temperature of only 20° C. can produce an increase in propagation time by the period of one entire cycle at a transponder frequency of about 915 MHz, correspondingly, a change of about 1° C. results in a relative phase change of about 18°. The potential range of variation in an uncontrolled environment therefore requires an internal temperature reference/compensation mechanism.

This known sequential frequency excitation (chirp) interrogation surface acoustic wave transponder system provides a number of advantages, including high signal-to-noise performance, and the fact that the output of the signal mixer at the interrogator receiver—namely, the signal which contains the difference frequencies of the interrogating chirp signal and the transponder reply signal—may be transmitted over inexpensive, shielded, twisted-pair wires because these frequencies are, for example, typically in the audio range. Furthermore, since the audio signal is not greatly attenuated or dispersed when transmitted over long distances, the signal processor may be located at a position quite remote from the signal mixer, or provided as a central processing site for multiple interrogator antennae.

Passive transponder encoding schemes include selective modification of interrogation signal transfer function H(s) and delay functions f(z). These functions therefore typically generate a return signal in the same band as the interrogation signal. Since the return signal is typically mixed with the interrogation signal, the difference between the two will generally define the information signal for analysis, along with possible interference and noise. By controlling the rate of change of the interrogation signal frequency with respect to a maximum round trip propagation delay, including internal delay, as well as possible Doppler shift, the maximum bandwidth of the demodulated signal may be controlled. Thus, the known systems employ a chirp interrogation waveform which allows a relatively simple processing of limited bandwidth transponder signals.

Known surface acoustic wave passive interrogator label systems, as described, for example, in U.S. Pat. Nos. 4,734, 698; 4,737,790 4.703,327; and 4,951,057, include an interrogator comprising a voltage controlled oscillator which produces a first signal at a radio frequency determined by a control voltage supplied by a control unit. This signal is amplified by a power amplifier and applied to an antenna for transmission to a transponder. The voltage controlled oscillator may be replaced with other oscillator types.

For example, as shown in FIG. 2, the signal S1 is received at the antenna 24 of the transponder 20 and split into a number of subsignals $I_N$ by combiner 42. The subsignals are each subject to a different signal modification element $A_N(f)$, $T_N(f)$ 40, and returned to the combiner 42. Each signal modification element 40 converts a portion of the first (interrogation) signal S1 into a second (reply) signal S2, encoded with an information pattern. The signal conditioning elements 40 are selectively provided to impart a different response code for different transponders, and which may involve separate intermediate signals $I_0, I_1 \ldots I_N$ within the transponder. Each signal conditioning element 40 comprises a known delay $T_i$ and a known amplitude modification $A_i$ (either attenuation or amplification). The respective delay $T_i$ and amplitude modification $A_i$ may be functions of the frequency of the received signal S1, constant independent of frequency, or have differing dependency on frequency. The order of the delay and amplitude modification elements may be reversed; that is, the amplitude modification elements $A_i$ may precede the delay elements $T_i$. Amplitude modification $A_i$ can also occur within the path $T_i$. The modified signals are combined in combining element 42 which combines these intermediate signals (e.g., by addition, multiplication or the like) to form the reply signal S2 and the combined signal emitted by the antenna 18.

The information pattern is thus encoded as a series of elements having characteristic delay periods $T_0$ and $\Delta T_1$, $\Delta T_2, \ldots \Delta T_N$. Two common types of encoding systems exist. In a first, the delay periods correspond to physical delays in the propagation of the acoustic signal. After passing each successive delay, a portion of the signal $I_0, I_1, I_2 \ldots I_N$ is tapped off and supplied to a summing element. The resulting signal S2, which is the sum of the intermediate signals. $I_0 \ldots I_N$, is fed back to a transponder tag antenna, which may be the same or different than the antenna which received the interrogation signal, for transmission to the interrogator/receiver antenna. In a second system, the delay periods correspond to the positions of reflective elements, which reflect portions of the acoustic wave back to the launch transducer: where they are converted back to an electrical signal and emitted by the transponder tag antenna. The signal is passed either to the same antenna or to a different antenna for transmission back to the interrogator/receiver apparatus. The second signal carries encoded information which, at a minimum, serves to identify the particular transponder.

The modified transponder (second) signal is picked tip by antenna 56, as shown in FIG. 7. Both this second signal and the first signal (or respective signals derived from these two signals) are applied to a mixer 68 (four quadrant multiplier) to produce a third signal S3 containing frequencies which include both the sums and the differences of the frequencies contained in the signals S1 and S2. The signal S3 is passed to a signal processor 102 which determines the amplitude $a_i$ and the respective phase $\phi_i$ of each frequency component $f_i$ among a set of frequency components $(f_0, f_1, f_2 \ldots)$ in the signal S3. Each phase $\phi_i$ is determined with respect to the phase $\phi_0=0$ of the lowest frequency component $f_0$. The signal S2 may be intermittently supplied to the mixer by means of a switch (not shown), and indeed the signal processor may be time-division multiplexed to handle a plurality of S2 signals from different antennas 56.

The information determined by the signal processor 102 is passed to a computer system comprising, among other elements, a random access memory (RAM) 104 and a microprocessor 106. This computer system analyzes the frequency, amplitude and phase information of the demodulated signal and makes decisions based upon this information. For example, the computer system may determine the identification number of the interrogated transponder 20. This I.D. number and/or other decoded information is made available at an output 107 to host computer 108.

In one known interrogation system embodiment, the voltage controlled oscillator 72 is controlled to produce a sinusoidal RF signal with a frequency that is swept in 128 equal discrete steps from 905 MHz to 925 MHz. Each frequency step is maintained for a period of 125 microseconds so that the entire frequency sweep is carried out in 16 milliseconds. Thereafter, the frequency is dropped back to 905 MHz in a relaxation period of 0.67 milliseconds. The stepwise frequency sweep 46 shown in FIG. 3B thus approximates the linear sweep 44 shown in FIG. 3A.

Assuming that the stepwise frequency sweep 44 approximates an average, linear frequency sweep or "chirp" 47, FIG. 3B illustrates how the transponder 20, with its known, discrete time delays $T_0, T_1 \ldots T_N$, produces the second (reply) signal S2 with distinct differences in frequency from the first (interrogation) signal S1. Assuming a round-trip, radiation transmission time of $t_0$, the total round-trip times between the moment of transmission of the first signal and the moments of reply of the second signal will be $t_0+T_0$, $t_0+T_1, \ldots t_0+T_N$, for the delays $T_{0N}, T \ldots, T_1$, respectively. Considering only the transponder delay $T_N$, at the time $t_R$, when the second (reply) signal is received at the antenna 56, the frequency 48 of this second signal will be $\Delta f_N$ less than the instantaneous frequency 47 of the first signal S1 transmitted by the antenna 56. Thus, if the first and second signals are mixed or "homodyned", this frequency difference $\Delta f_N$ will appear in the third signal S3 as a beat frequency. Understandably, other beat frequencies will also result from the other delayed frequency spectra 49 resulting from the time delays $T_0, T_1 \ldots T_{N-1}$. Thus, in the case of a "chirp" waveform, the difference between the emitted and received waveform will generally be constant.

In mathematical terms, we assume that the phase of a transmitted interrogation signal is $\phi=2\pi f \tau$, where $\tau$ is the round-trip transmission time delay. For a ramped frequency $df/dt$ or f, we have: $2\pi f \tau = d\phi/dt = \omega$. $\omega$, the beat frequency, is thus determined by $\tau$ for a given ramped frequency or chirp f. In this case, the signal S3 may be analyzed by determining a frequency content of the S3 signal, for example by applying it to sixteen bandpass filters (of any implementation), each tuned to a different frequency, $f_0$, $f_1 \ldots f_E, f_F$. The signal processor 102 determines the amplitude and phase of the signals that pass through these respective filters. These amplitudes and phases contain the code or "signature" of the particular signal transformer 40 of the interrogated transponder 20. This signature may be analyzed and decoded in known manner.

The ranges of amplitudes which are expected in the individual components of the second signal S2 associated with the respective pathways or tap delays 0-F may be predicted. The greatest signal amplitudes will be received from pathways having reflectors in their front rows; namely, pathways 0, 1, 4, 5, 8, 9, C and D. The signals received from the pathways having reflectors in their back rows are somewhat attenuated due to reflections and interference by the front row reflectors. If any one of the amplitudes $a_i$ at one of the sixteen frequencies $f_i$ in the third signal S3 falls outside its prescribed or predicted range, as shown in FIG. 5, the decoded identification number for that transponder is rejected.

As indicated above, acoustic transponders are susceptible to so-called "manufacturing" variations, due to intertransponder differences, as well as temperature variations in response due to variations in ambient temperature. This is particularly the case where small differences in tap delays, on the order of one SAW cycle period, are measured to determine the encoded transponder identification number. These manufacturing and/or temperature variations can, in this case, be in the same order of magnitude as the encoded informational signal.

As explained above, the transponder identification number contained in the second (reply) signal is determined, for example, by the presence or absence of delay pads in the respective SAW pathways. These delay pads make a slight adjustment to the propagation time in each pathway, thereby determining the phase of the surface acoustic wave at the instant of its reconversion into electrical energy at the end of its pathways. Accordingly, a fixed code (phase) is imparted to at least two pathways in the SAW device, and the propagation times for these pathways are used as a standard for the propagation times of all other pathways. Likewise, in a reflector-based acoustic device, a reflector may be provided at a predetermined location to produce a reference signal.

The entire process of compensation is illustrated in the flow chart of FIG. 6. As is indicated there, the first step is to calculate the amplitude $a_i$ and phase $\phi_i$ for each audio frequency $f_i$ (block 180). Thereafter, the sixteen amplitudes are compared against their acceptable limits (block 132). These limits may be different for each amplitude. If one or more amplitudes fall outside the acceptable limits, the transponder reading is immediately rejected. If the amplitudes are acceptable, the phase differences $\phi_{ij}$ are calculated (block 184) and the temperature compensation calculation is performed to determine the best value for $\Delta T$ (block 186). Thereafter, the offset compensation calculation is performed (block 184) and the phases for the pathways 2, 3. 6, 7, A. B and E are adjusted. Finally, an attempt is made to place each of the pre-encoded phases into one of the four phase bins (block 190). If all such phases fall within a bin, the transponder identification number is determined; if not, the transponder reading is rejected.

There are a number of other passive remotely readable information bearing devices, such as bar codes, color codes, other types of radio frequency devices, and the like.

Known wireless communications systems include various cellular standards (IS-41, IS-95, IS-136, etc.) as well as so-called PCS standards and data-only standards, including Cellular Packet Data Protocol (CPDP). The Metricom "Ricochet" system provides a frequency hopping 915 MHz spread spectrum wireless local data access system. These communications standards, due to their extensive infrastructure, allow a large number of simultaneous users to communicate over separate communications channels within a relatively small band without substantial mutual interference. Therefore, communications channels may be appropriated for near real time communications needs, such as voice and navigational data.

SUMMARY AND OBJECTS OF THE INVENTION

According to the present invention, a plurality of passive remotely interrogable information devices are provided dispersed through an environment. A stored or synthesized map relates a set of identification codes of proximate information devices with a specific location within the environment. The information devices do not necessarily each have sufficient information storage (or transmission) capacity to uniquely define a location. However, the information contained in a proximate group of information devices together carry sufficient information. In obtaining the information contained in the group of information devices, this may be obtained simultaneously, but preferably it is obtained sequentially, with a record kept of the relative positions of each information device. Thus, the set of locations and information contents are used to search a more global map or mapping function to determine an absolute location.

Where the environment includes a set of predefined paths, e.g., roads or isles, the map may be a set of topologically interconnected one dimensional strings of code sequences. Where the locations are not limited by predefined paths, and the receiver is free to roam, the map includes a two-dimensional array of codes.

The information devices may be randomly dispersed, and thus the sequence of codes is random, such that it is unlikely that a number of devices, e.g., 5 sequential information devices along any path, would be repeated along any other path, and less likely that 10 sequential along any path would be repeated. Thus, for limited environments, information codes from, e.g., 5 or 10 sequential devices would uniquely define a location of the interrogator. Once a global location within the environment is determined, incremental movements within the environment are more easily tracked, so that often only a single additional information device must be read in order to determine the change in location, within the granularity of the spacing of information devices. Thus, relatively simple information devices and receiver devices may be used to accurately define a location.

The information devices are distributed co avoid close proximity of indistinguishable codes, and to avoid regular or repeating patterns. Thus, the distribution of information devices must be (a) random; (b) pseudorandom, or (c) regular with no repetition along any path along any predefined path or two-dimensional surface. Thus, when distributing the encoded information devices, a sensor may be used to read an information device or tag before placement, seeking to ensure that it meets the requirements for efficient localization within the environment. The sensor may thus "veto" a selection of device which raises a probability of ambiguity. A predetermined mapping or mapping function may also be defined, thus specifying which information device codes are to be present at each location.

During arrangement and distribution of the information devices, preferably these are stored in bins or identified. It is therefore advantageous to provide a limited number of codes, for example less that 256 codes, and more preferably between 16 and 64 different codes.

Where the array of information devices is small, random placements may be effective. However, where the array is large, it may be advantageous to define a pseudorandom pattern of information devices throughout the environment with a pattern which does not repeat over the encompassed area, or which provides other positional cues to resolve an ambiguity due to repeated sequences. These pseudorandom sequences may be generated by relatively simple electronic devices, and used to control or suggest placement of devices. The advantage of a pseudorandom placement defined by a mathematical function is that the mapping function is defined by the compact mathematical function and therefore allows a relatively low memory capacity processor to determine location.

Where an identification code pattern follows a pseudorandom sequence, advantageously a pseudorandom pattern generator-based system may be used to determine the location by correlating a received sequence with potential paths through the one-dimensional or two-dimensional pseudorandom pattern space, as appropriate for the application, until matches are found. If additional data reveals an error, further searching is conducted until a correct placement is determined. After the position is correctly and unambiguously determined, each additional information device code allows a simple nearest-neighbor search within the map to determine the change in location. If ambiguity is detected (two possible locations), other cues may be used to determine location, such as distance (wheel revolution sensor), direction (steering direction, compass, inertial sensor), inertial presumptions, and the like.

While a regular pattern of identification codes may also be used, this technique may be less efficient at conveying information, according to known information theory, unless it gains the pseudorandom presentation, in which case it potentially remains less efficient because it lacks a simple mathematical descriptive function.

The system according to the present invention has a number of advantages over, and differences with respect to other geopositioning systems, such as GPS, differential GPS. GLONASS, etc., in that submeter accuracy is easily obtained, jamming is possible only from nearby systems, it can provide nearly instantaneous lock-on, is subject to no shadowing from urban structures, and has low cost. Further, the system according to the present invention may be integrated into other Systems, providing further cost savings due to common processing elements, input and output, power supply and/or packaging. Therefore, the system according to the present invention may be used in conjunction with such other systems to provide a coarse and fine positioning accuracy. Thus, a geopositioning system (e.g., GPS), dead reckoning, inertial guidance, or other type of system may be used to define a coarse position, initial starting position or consistency check. Further, an initial position may be input manually. This position may be used as an input into the positioning system according to the present invention to provide a starting point for a search of the database to find the location of the interrogator. Thus, where the positional ambiguity is substantial over a large database, the initial position may be defined to allow useful operation without requiring a very large number of transponders to be read or a protracted search and analysis of the database to find a consistent position. Thus, a commercial GPS system may provide a positioning accuracy of ±100 meters. This GPS-derived position, which is insufficiently accurate to define a highway lane or exit location, may then be used to define a coarse position, facilitating initial localization using the transponder encoding method. Thereafter, the fine position and changes in position are tracked using primarily the transponders, assuming they are closely spaced. If they are not closely spaced, then another system may be used to define the location, with the transponder locations used to define differential corrections. In the event that the various localization systems produce inconsistent location information, then an error checking routine may be initiated to identify the source and effect of the error. Once completed, the system may recalibrate according to the defined conditions, or alert the user.

It is noted that, according to the present invention, transponders need not be evenly or regularly spaced through the environment, and therefore regions of low density and high density may exist. As stated above, the strategy for use of low and high density transponder codes may differ. Further, in the case of low density transponder environments, it may be desired to provide a greater encoding capability per transponder. Thus, in a low density environment, a transponder may completely and unambiguously define its position, while in a high density environment, lower encoding capability transponders may be employed. Likewise, in a high transponder density environment, transponders of small and great encoding capabilities may be interspersed.

Since the environment of operation may be uncontrolled, and the stored maps and distribution of transponders subject to change and mishap, it is preferred that the system according to the present invention operate according to an algorithm which is tolerant of interference, misreads, false reads, and non-correspondences between the stored map and environmental distribution of transponders. Thus, an error tolerant system is preferably provided. One way to provide such tolerance is to provide an algorithm which, instead of seeking an exact match between a string of codes, compares the actual code string received from the transponders with the stored map, to determine a correlation, which is considered to indicate a correspondence if it exceeds a certain threshold. While this may increase the potential degree of ambiguity this can be compensated by correlating longer strings. Statistical processing of the data may be used to increase confidence in a reading to a transponder code, and processing of the RF signal may be used to identify and characterize interference. However, damage to, movement of, or replacement of transponders would remain as issues. Such error tolerant processing is preferably used in conjunction with secondary localization schemes, as discussed above.

The system according to the present invention may employ an acoustic RF transponder having a code space of $2^3$-$2^8$ for each device, allowing use of a small device with lower precision than required of a device having a larger code space. Further, with a small number of codes, the requirement of secondary processing of a received signal to define "low order" codes is eliminated. Thus, the required electronics are simpler and of lower required precision.

The system according to the present invention relies on a memory, for example an EEPROM memory, which includes sufficient information, either a map or a mapping function, to correlate the particular identifying code of an information device with its location. A sequence of codes, and preferably their relative sequence or locations, is correlated with the stored map or expanded mapping equation to determine possible locations which meet the received sequence. As the number of codes received increases, the number of possible locations decreases, unless there is an ambiguity in the map. Mathematical analysis of potential mapping functions and static maps may be used to eliminate such ambiguities. In the case of a truly random placement of tags, such ambiguities remain possible. Eventually, any ambiguity will (hopefully) disappear or be small. Further, other cues or presumptions may be applied to help determine location, such as a presumption of continuity in space, inertia, and models of activity, such as "travel to left of markers".

In order to accommodate errors in the placement of tags, and/or errors in reading tags, a fault tolerant design is employed. For example, errors may be due to erroneous placement or replacement, or missing or defective tags. In this case, a memory "overlay" may be provided to correct the system output. The memory may be updated adaptively, as necessary and/or the system correlated with landmarks at known locations. Thus, if a device, is randomly replaced with another device with a different code, the error would become apparent after traversing a few more markers, and the correction memory updated to reflect the change. If a tag is erroneously read, the memory overlay may be corrupted, but the location would nevertheless be determined after reading a few more tags.

Thus, in addition to the mapping system, a statistical process is implemented to assure stabile operation and location determination even under noisy conditions. One way to achieve this is to provide that the environment be dotted with a greater number of tags than minimally necessary for the application, providing redundant information in the scheme, and therefore providing error tolerance.

A number of methods are available for determining a location based on a set of identification codes. In a first embodiment, a memory architecture provides an address space in which the row and column addresses have some correspondence to positional coordinates. When a first identification code is received, the memory is searched and all instances of the occurrence of that code in the memory are identified. When the second code is received, the memory is searched, with emphasis on those occurrences of the second code proximate to the first code. Likewise, when subsequent codes are received, the search is narrowed to clusters containing a path through the sequence of codes. When the position is unambiguously determined, further relative position changes may be tracked by restricting the search to locations nearby the last confirmed location. In a case where a new identification code fails a consistency check, i.e., where a change in distance from the last position is unreasonable, or other positions of intervening identification codes are skipped, the update of position may be suppressed until further position information is received, confirming or refuting a putative position. The output position in this case may represent an intelligent prediction of the position based on other data. If the inconsistency is persistent, then the memory system may be updated to reflect the actual circumstances.

In another embodiment, the position information and identification codes are stored in a memory, indexed by identification code. Therefore, with the identification code as an input, the matching locations are returned. The matching locations of a sequence of identification codes are analyzed to determine a probable path, by determining a cluster location consistent with the received data, and then determining the consistent path.

In a third embodiment, pairs of identification codes representing adjacent positions are stored in memory. When two identification codes are received, the pair forms an address, which is retrieved from the memory. The memory, in turn, stores a pointer to a set of consistent locations. This set will be geometrically smaller than a set of single identification code consistent positions. When a new identification code is received, a new set corresponding to the updated pair is accessed. Based on the old position, a threshold window is determined, and used to screen the new set. Where multiple positions match the window reference may be made to data representing a larger number of old identification codes, which are used to further screen the location. In this case, the threshold window for older data must be enlarged, to account for possible position changes of the detector. Assuming a random distribution of identification codes, after sensing of a number of identification codes, the positional determination may become unambiguous. After an unambiguous determination of position, subsequent position may be determined by predicting a path and updating the prediction based on received data.

In the case of a pseudorandom mapping equation, the locations of encoded tags are prescribed by a formula. This formula may then be evaluated to provide a complete map. The advantage of this system is that complete maps are not necessary. The simplest way to use this system is to evaluate portions of the mapping equation and storing this in a small memory buffer. The buffer is then searched to determine a correspondence with available data. When a high degree of correspondence is determined, a putative location is output. Additional tag code data is evaluated, and if consistent with the buffered portion of the decoded map, the determined location is output. On the other hand, if it is inconsistent, the mapping function space is further searched for potential consistent locations. It is noted that all possible consistent locations may be identified. It is also noted that the initial search time may be considerable, especially with a low-end microprocessor and a large mapping space; however, with relatively small mapping spaces and/or after initial localization (the initial location may be input extrinsically, even a low computing power so stem would be able to quickly update a position.

Other types of data analyses are also possible.

In one system, for example, each information device holds $2^8$ bits of information, i.e., there are 256 different codes. An environment is seeded with information devices every 12 feel, over an area of 1 square mile. Thus, about 193,000 dots are provided. Assuming a balanced number of each code, there will be approximately 756 dots of each type. However, where codes are paired, there will be only about 3 similar pairs. Using one additional code or other information, the position may generally be unambiguously determined, thus, under these circumstances, two codes, or a movement distance of about 24 feet, allows a trifold ambiguity, while a movement of about 36 feet allows unambiguous localization.

The system according to the present invention may be used, for example, to provide location information for vehicles on a highway, for intelligent warehouses, and ocher applications. Because the resolution is limited only by the type of transponder and quality of receiver, it is possible to reasonably obtain resolutions of less than about 0.5 meter for RF transponders, and less than about 1 cm for optical transponders, even over very large distances. Precision is limited primarily by the initial mapping of the locations of the encoded devices. Thus, the system according to the present invention is usable in many circumstances where radio-location systems, such as GPS are not. In addition, the information device transponders may be made efficiently and cheaply, due to the limited range and codespace, while the receiver complexity resides primarily in the ambiguity resolution analysis, easily handled by presently available microprocessors and/or digital signal processors, or application specific integrated circuits (ASIC). Thus, while the initial determination of a location based on a set of relatively small codes, and optionally a path prediction, may require significant analysis, this analysis is not beyond the capability of available systems.

The analyzer may combine a number of strategies to achieve a most efficient result; however, the minimum required response time for the most difficult analysis will determine the processing capabilities required, and thus increased efficiency gained through choosing a best strategy may not produce a significantly better or noticeably faster result. On the other hand, under circumstances where the processor has excess processing capacity, advanced statistical analysis, interpolation and consistency checking of data may easily be implemented.

The receiver for a radio frequency transponder system operates as follows. An interrogation signal is emitted, which may be a pulse, continuous wave, frequency chirp, frequency hopping spread spectrum carrier, direct sequence spread spectrum carrier, or the like. The interrogation signal interacts with a transponder, which modifies the interrogation signal and returns it to a receiver. The receiver analyzes the interrogation signal in known manner to determine the information code of the nearest transponder. More distant transponders and noise may be filtered using known techniques. Adjacent interrogation systems may be distinguished by time or frequency multiplexing techniques, or by spread spectrum techniques. Because of the limited codespace, however, the receiver has relaxed technical requirements as compared to receivers for larger codespace devices. The determined code, optionally alone with other information which may help define a location, is passed to an analyzer, which then outputs a position, and optionally direction, velocity acceleration, etc.

While a pseudorandom sequence of information devices provides efficiencies in storing a map, this method also poses the difficulties in maintenance of the physical system to correspond to the generating algorithm. For example, a missing information device would have to be replaced with an identical information device, or an exception generated. Further, great care must be taken when first implementing the system to assure a workable algorithm. Of course, in both a map and algorithm based system, an exception map may be provided, the use of an exception map reduces the advantages of an algorithm, and may grow large in size over time and may slow analysis. A map-based system may be adaptive (alterable), and thus might avoid the need for separately stored exceptions.

Where the information devices are established as regular fixtures of a highway, for example, then these may be incorporate as part of a guidance and control system of a vehicle, for example to prevent unintended swerving out of a lane, as part of an intelligent cruise control system, and as part of a geographical localization system.

While a preferred embodiment provides a radio frequency transponder system, optical systems may also be used, which may be encoded with colors, binary optical codes, or other optical indicia.

It is therefore an object of the invention to provide a localization system comprising an information device reader, a memory for storing mapping information, a memory for storing sets or proximate information device codes received by the reader, and a search engine for searching the stored mapping information for map regions consistent with the sets of proximate information codes.

It is also an object according to the present invention to provide a distributed set of information devices, each device having a non-unique code, said codes being distributed pseudorandomly or randomly through the environment space.

It is another object of the invention to provide a data storage medium containing a map or mapping function describing codes of a distributed set of information devices and relating an identification of a device with a position thereof.

It is a further object of the invention to provide a method for determining a location comprising dispersing through an environment space a set of encoded information devices, each having a non-unique encoding, in a random or pseudorandom pattern; storing a mapping of codes for encoded information devices in conjunction will a location thereof in the environment space; receiving codes from a set of proximately disposed information devices; and searching the mapping to identify a location having consistent set of proximate information devices.

These and other objects will become apparent from a review of the detailed description of the preferred embodiments.

BRIEF DESCRIPTION OF THE DRAWINGS

FIGS. 7A and 7B are schematic diagrams of a typical acoustic wave transponder interrogation system;

FIGS. 9A and 9B show identification code distributions for a constrained path environment and free roaming environment, respectively.

DETAILED DESCRIPTION OF THE PREFERRED EMBODIMENTS

Figure 1:
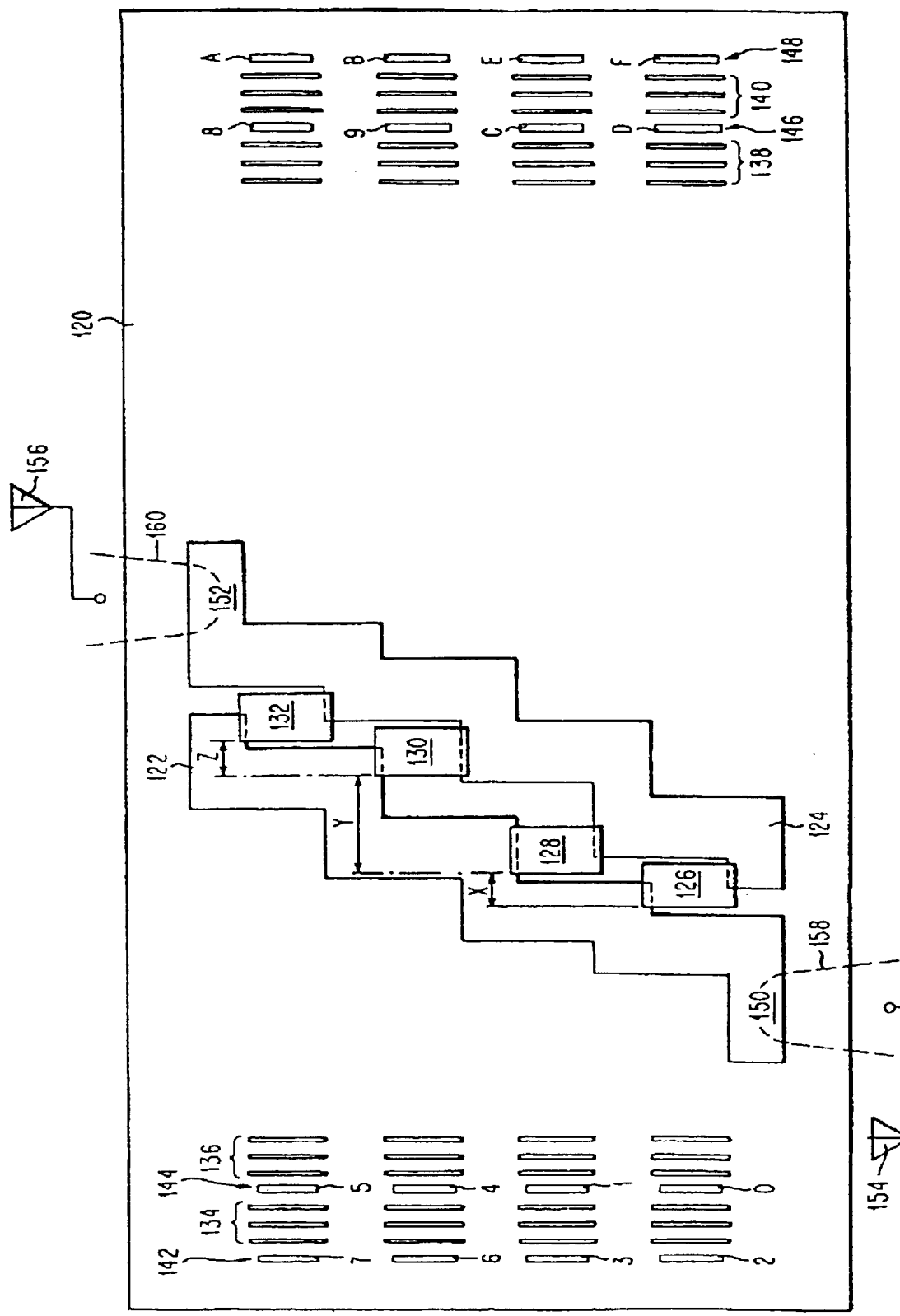
FIG. 1 is a top view of a known passive surface acoustic wave transponder device.
Figure 2:
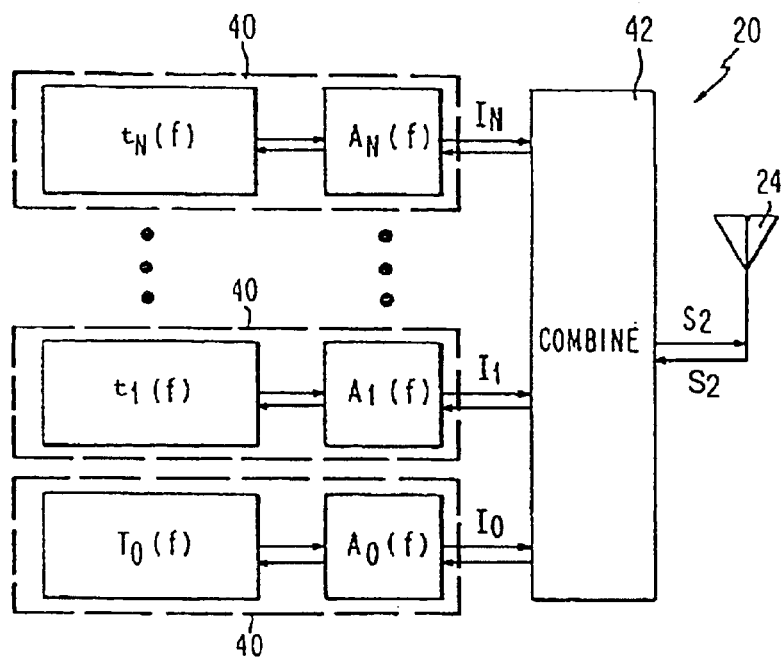
FIG. 2 is a block diagram of a transponder device corresponding to FIG. 1.
Figure 3A:
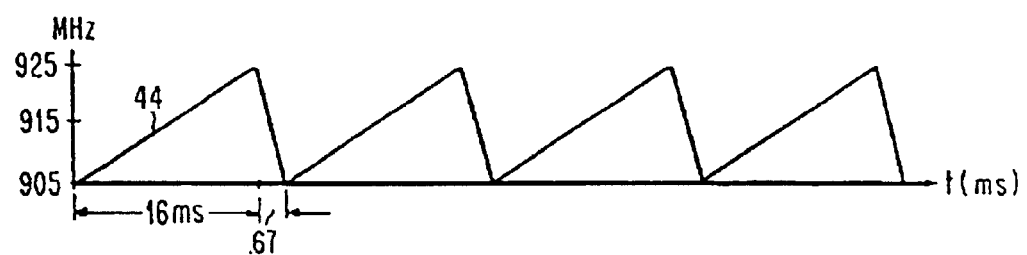
FIGS. 3A and 3B are time diagrams, drawn to different scales, of the radio frequencies contained in the interrogation and reply signals which interact with the transponder device according to FIG. 1.
Figure 3B:
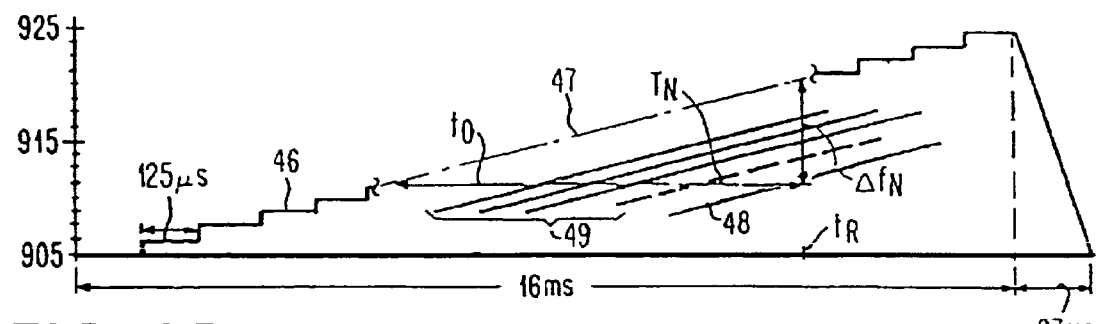

The preferred embodiments of the present invention will now be described with reference the drawings. Identical elements in the various figures are designated with the same reference numerals.

An interrogation system according to the present invention is provided which employs a frequency hopping spread spectrum signal having a pseudorandom sequence which excites each of a set of approximately evenly spaced frequencies once during each repetition. The interrogation signal occupies a band of approximately 20 MHz centered at 915 MHz. The band is divided into 128 discrete frequencies, each of which is maintained for about 128 $\mu$S before hopping to a different frequency, which is preferably not an adjacent frequency. The interrogation signal is generated by a digitally controlled oscillator, including a phase locked loop with voltage controlled amplifier. The sequence is selected to evenly spread energy through the band, without concentrating the wave energy in a narrow range for an extended period, thus effectively obtaining the advantages of a frequency hopping spread spectrum communication system. Such sequences are known in the art, and may be generated based on a lookup cable or pseudorandom sequence generator.

Known transponder devices typically employ 16 degrees of freedom in their code space, generated in accordance with the embodiment of FIG. 1 by four bi-directional transducers, each wave having two sets of elements to interact with. Thus, the interrogator must resolve the 16 degrees of freedom in order to identify the transponder. In order to resolve these decrees of freedom, at least 16 distinct conditions must be applied to the transponder, producing a response which allows solution of the simultaneous equations. Since at least 16 conditions, in this case different frequencies, are required, the larger available number of available frequencies allows robustness to interference and increased accuracy.

Figure 4:
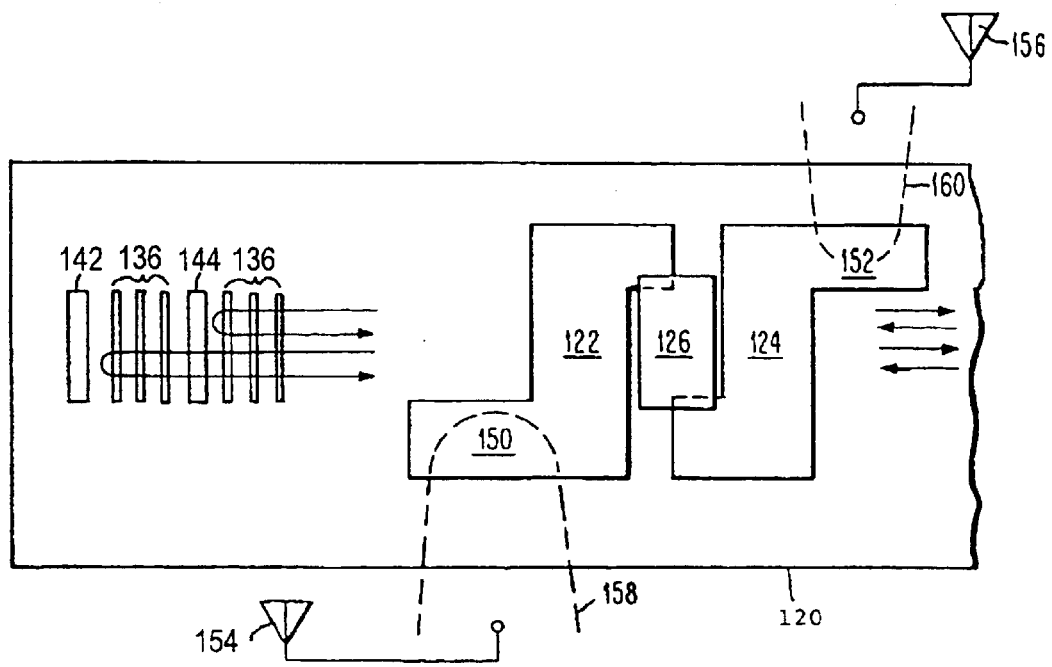
FIG. 4 is a block diagram showing antenna coupling and acoustic wave paths for a portion of an acoustic wave transponder device according to the present invention.
Figure 5:
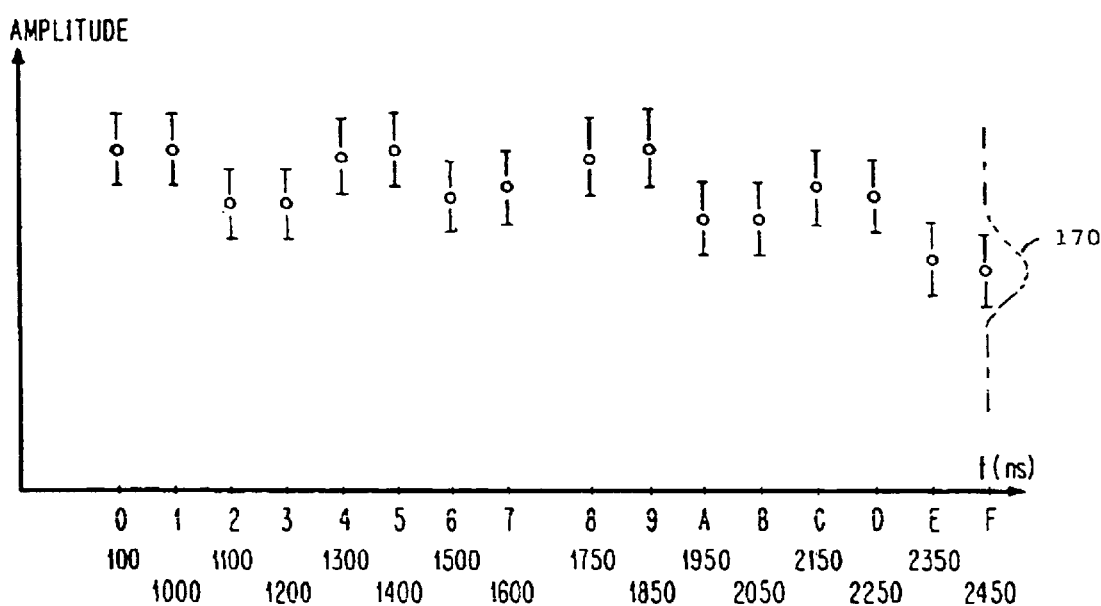
FIG. 5 is graph showing tolerance bins for received group information fin the system according to claim 1.

According to the present invention, pseudo-uniqueness of transponder codes within the environmental space is not required. Therefore, a much simpler transponder implementation is possible. For example, FIG. 4 shows a transponder having a single bi-directional acoustic wave transducer with two groups of three delay pads and a reflector in each group, along each wave path. This allows, in addition to the compensation pads (which may not be necessary in a simplified system) four degrees of freedom for each of two paths, thus defining a codespace of 32.

Figure 7B:
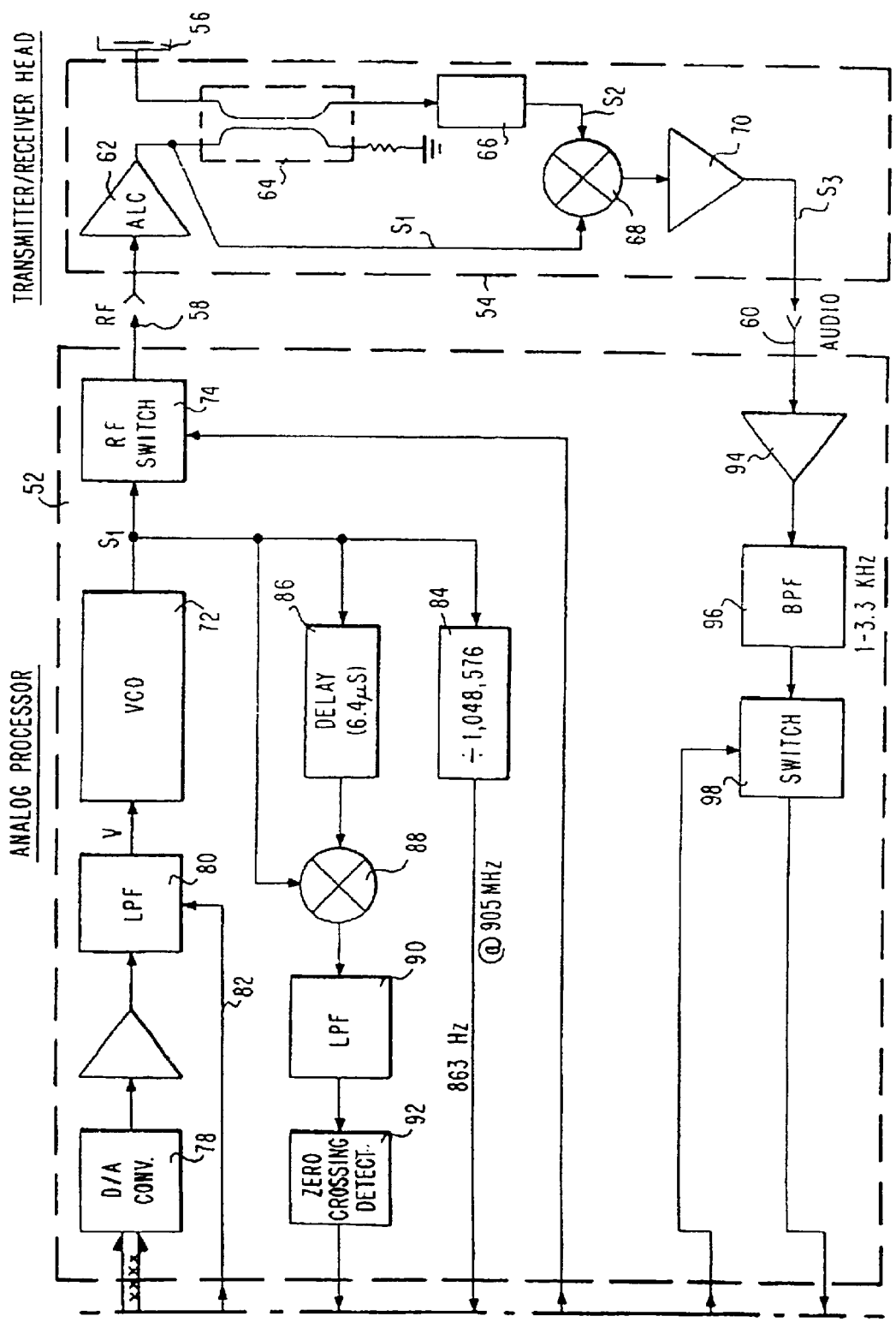

A microprocessor 76 is provided to control the system, generating the control signals for the digitally controlled oscillator, which in the embodiment shown in FIG. 7, includes a Digital to Analog converter 78, low pass filter 80 and voltage controlled oscillator 72.

Since only 4 discrete excitation parameters, of the 128 available, are required for an output of the transponder code, the analysis may proceed on an incomplete data set. Further, because of thus flexibility, the frequency hopping sequence need not repeat or excite each frequency at the minimum rate, so long as the analyzer is provided with data identifying the specific excitation conditions.

The receiver system includes an antenna 56 and amplifier, which receives a modified interrogation (second) signal S2 from the transponder 20. In some embodiments, this second signal S2 may be normalized in amplitude by an automatic gain control or limiter, since the phase relationships within the signal encode useful information relating to the encoding. However, in many instances, the signal also carries useful information encoded in the amplitude, which would be lost in a limiter. Therefore, a phase-amplitude response analysis of the transponder signal is preferred. This phase-amplitude response thus encompasses amplitude variations, phase variations and/or amplitude and phase variations. The modified interrogation signal S2 is mixed in a demodulator with a representation of the interrogation signal S1. The demodulator is a double balanced mixer 68, operating at up to at least 1 GHz. The representation of the interrogation signal S1 may be the first signal S1 itself, as being simultaneously output, a delayed replica of the signal, or an independently generated signal. The purpose of this mixer 68 is to ultimately translate the frequency of the signal to baseband, to allow homodyne detection of the relative phase-amplitude response of the interrogation signal S1 represented in the transponder signal S2. Where the signals 51, S2 are in phase, the output S3 of the mixer 68 is maximal, and decreases as the respective phases reach quadrature, turning negative as the signals move completely out of phase. Due to the composite nature of the transponder signal 32, being the superposition of the modifications in each acoustic path in the transponder device 20, as each component of the wave is initially received after a frequency hop, the relative phase will change. After the transient response, due to the elements 40 within the signal path, has abated, the relative phase will be static until the next hop. The Output of the mixer 68 is also related to the relative amplitude of the transponder signal S2.

An integrator 70, which may be implemented as a two pole R-C low pass filter, having both time-constants of about 10 $\mu$S, and a frequency cutoff of about 100 kHz, receives the output of the mixer 68, and thus produces a filtered output representing the relative phase for each excitation frequency. The filter output is sampled by a sample hold amplifier 100 after the transients have abated and the signal has settled, for example four to five time constants of the filter, e.g. 40–50 $\mu$S.

Of course, the filter 70 need not be so simple, and may, for example, include an active filter, digitally controlled integrator having a predetermined integration period, or other type.

The duration of each hop is longer than the longest delay in a transponder as well as the travel delay. Thus, where a maximum delay within a transponder is less than about 10 $\mu$S, a stationary frequency dwell period is greater than 10 $\mu$S; practically, this dwell period may be much greater than this minimum amount.

In the preferred embodiment, a single frequency is emitted as the interrogation signal at any time, however, a plurality of such frequencies may be emitted simultaneously or concurrently. In that case, the receiver system may include a multichannel decoder for selectively decoding each of the frequencies simultaneously (thus, for example, employing a plurality of mixers and integrators), or for selectively decoding one of the channels one at a time. If a digital signal processor is employed (rather than analog components), the processing power of the device will determine how much parallelism may be implemented.

The resulting low frequency signal S3, from homodyne demodulation of the interrogation signal with the transponder signal S2 at the same frequency, produces a signal with an amplitude related to the average phase-amplitude relation of the signals entering the never 68. This amplitude is determined, for example every 125 $\mu$S (8 kHz), with frequency hops occurring at this same rate. Because of the differences in the transponder signal S2 due the fixed nature of internal delays and the changing interrogation frequency, the phase-amplitude response at each frequency hop provides a datapoint for analyzing the various delays $t_N$ within the transponder 20.

Figure 6:
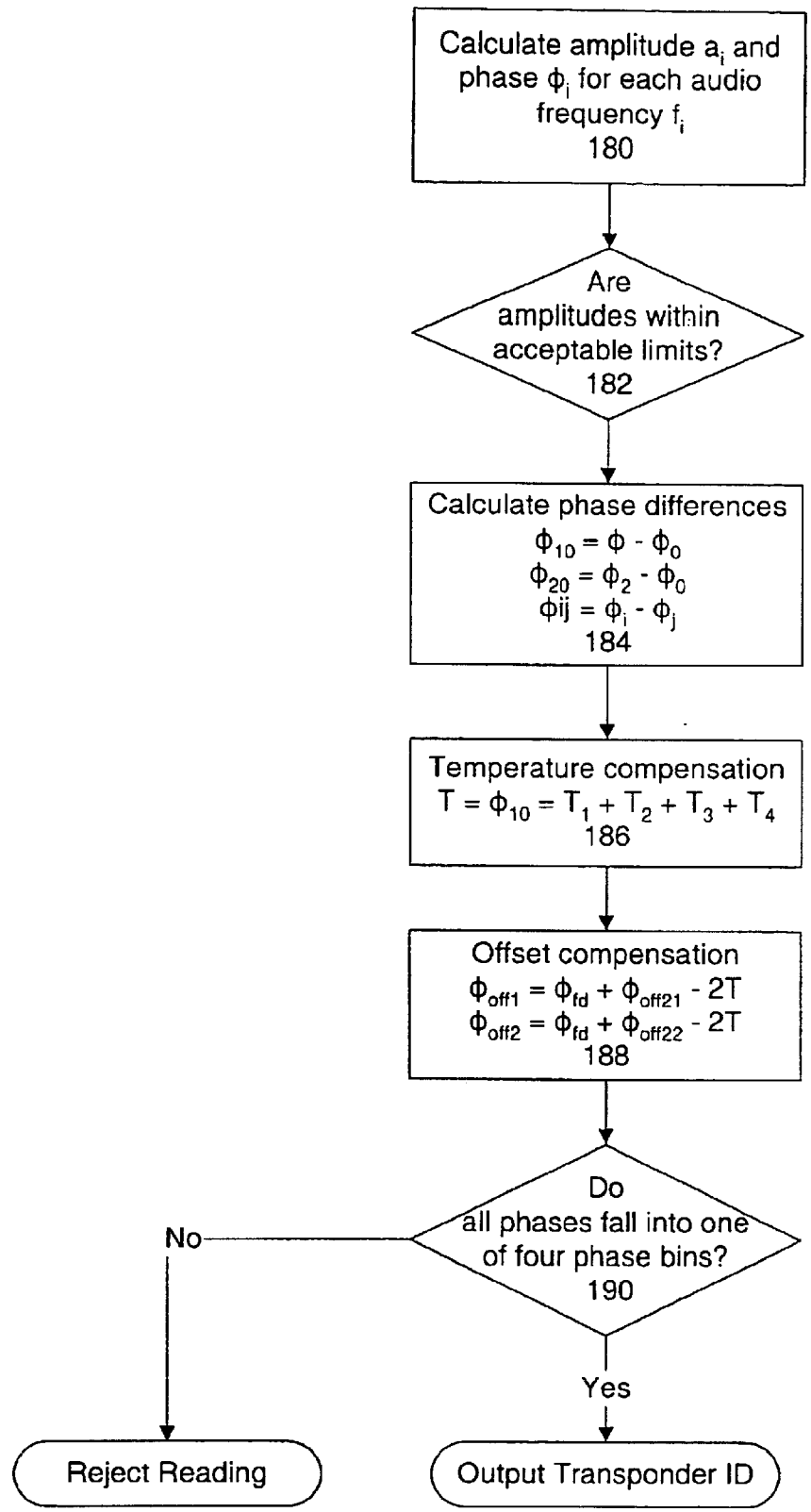
FIG. 6 is a flow diagram showing the order of calculations for identifying a code carried by an acoustic wave transponder.

In performing an analysis of the transponder signal S2, a number of compensations and corrections may be made. For example, the round trip signal delay may be normalized, yielding an estimate of distance by a time of arrival technique. Likewise, any Doppler shift in the signal may be determined and compensated, allowing an indication of relative speed. This later correction produces a relative frequency shift of the transponder signal S2 with respect to the interrogation signal S1. This frequency shift, however, is typically of a relatively low frequency, below the 8 kHz frequency hopping rate, and therefore introduces only small errors, which may be compensated in the analysis. Likewise, other potential causes for variations from the nominal delay periods of a transponder, including temperature changes, mask variations manufacturing variations and random variations may also be compensated in the analysis, in known manner. Since the determined decrees of freedom correspond to delays, the correction scheme is essentially as shown in FIG. 6.

The relative phase-amplitude output from the integrator 70 is digitized and stored in memory 104. While FIG. 7 shows a separate signal processor 102 and microprocessor 106, it should be understood that the respective functions may be integrated in a single device. The delay coefficients of the transponder 20 are determined, which correspond to the degrees of freedom, and corrections and compensations applied as necessary. Consistency checking may be performed for each data point, based on the redundant information from the larger number of datapoints available than are minimally necessary, excluding from analysis those which are likely to represent artifacts or interference.

The analyzer thus evaluates a set of simultaneous equations relating the integrated phase-amplitude responses to the characteristic set of signal perturbations of the passive acoustic transponder 20, compensating the evaluated degrees of freedom for predetermined variances, evaluating each integrated phase-amplitude response for consistency with a set of remaining integrated phase-amplitude responses, and producing an output of the delay coefficients.

Figure 8:
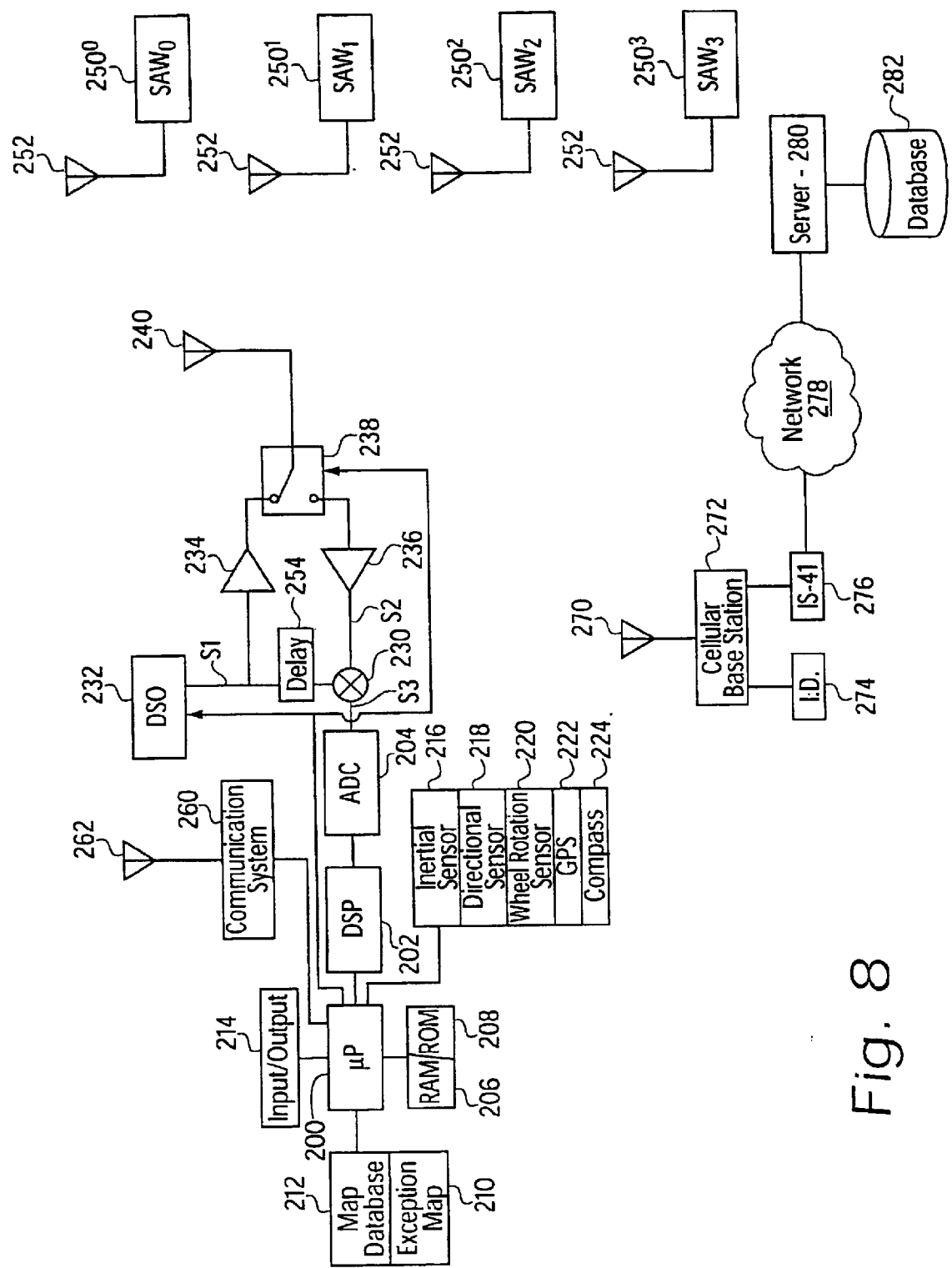
FIG. 8 is a block diagram of a location determination system in a guidance system of a vehicle according to the present invention.

According to the present invention, the interrogator system is provided on a mobile platform, such as a vehicle. As shown in FIG. 8, a microprocessor 200 controls a vehicular guidance system. The microprocessor 200 executes a program defined in non-volatile memory 208, and temporarily stores information in volatile memory 206. The microprocessor receives navigational information from an inertial sensor 216, a directional sensor 218, a wheel rotation sensor 220, a GPS subsystem 222 and a compass 224. The microprocessor 200 also interfaces with an input/output system 214, providing a human interface and integration with other electronic systems.

In an alternate embodiment, the database which stores the mapping information is remote from the interrogator device. In this case, a radio frequency communications link, for example employing the 900 MHz communication band, Ricochet, or using a CPDP protocol in the cellular communications band (about 832 MHz), allows the computer associated with the interrogator to communicate with the database in order to localize itself. This remote database system allows the mobile processor to maintain limited processing capabilities, and, in the case of a cellular communication systems, allows a coarse localization based on the proximity to the cellular antenna, thus reducing the amount of processing necessary. In fact, even with a database local to the mobile system, the identification of cellular antennas may still be used to localize the interrogator to reduce ambiguities.

The microprocessor 200 controls the interrogation cycle, for example by controlling a digitally synthesized oscillator 232 and an RF switch 238. The oscillator signal S1 is amplified by amplifier 234, and transmitted through antenna 240. As the antenna 240 is proximate to a transponder device $250^0$, $250^1$, $250^2$, $250^3$, the radiated RF signal interacts with a respective transponder antenna 252, and is received, modified and retransmitted as a transponder signal S2 by the passive acoustic wave transponders $250^0$, $250^1$, $250^2$, $250^3$. The transponder signal is received by the antenna 240, and by way of RF switch 238, supplied to amplifier 236. The amplified transponder signal S2 is mixed in mixer 230 with a representation of the oscillator signal S1, which is, for example, delayed by delay 254, which may be a surface acoustic wave delay line, similar to the transponders $250^0$, $250^1$, $250^2$, $250^3$ in construction. The output of the mixer 230 S3 is provided to an analog-to-digital converter 204, which has an integral sample hold amplifier, and input to the digital signal processor (DSP) 202. The DSP 202 processes the signal to identify the code of the respective transponder $250^0$, $250^1$, $250^2$, $250^3$. The microprocessor 200 receives the code identifying the transponder $250^0$, $250^1$, $250^2$, $250^3$ and processes it in conjunction with a map database 212 and an exception map database 210, to determine a location within an environment seeded with the transponders $250^0$, $250^1$, $250_2$, $250_3$. Inconsistencies are used to update the exception map database 210, to improve performance on subsequent visits to the same location having the inconsistency.

Figure 9A:
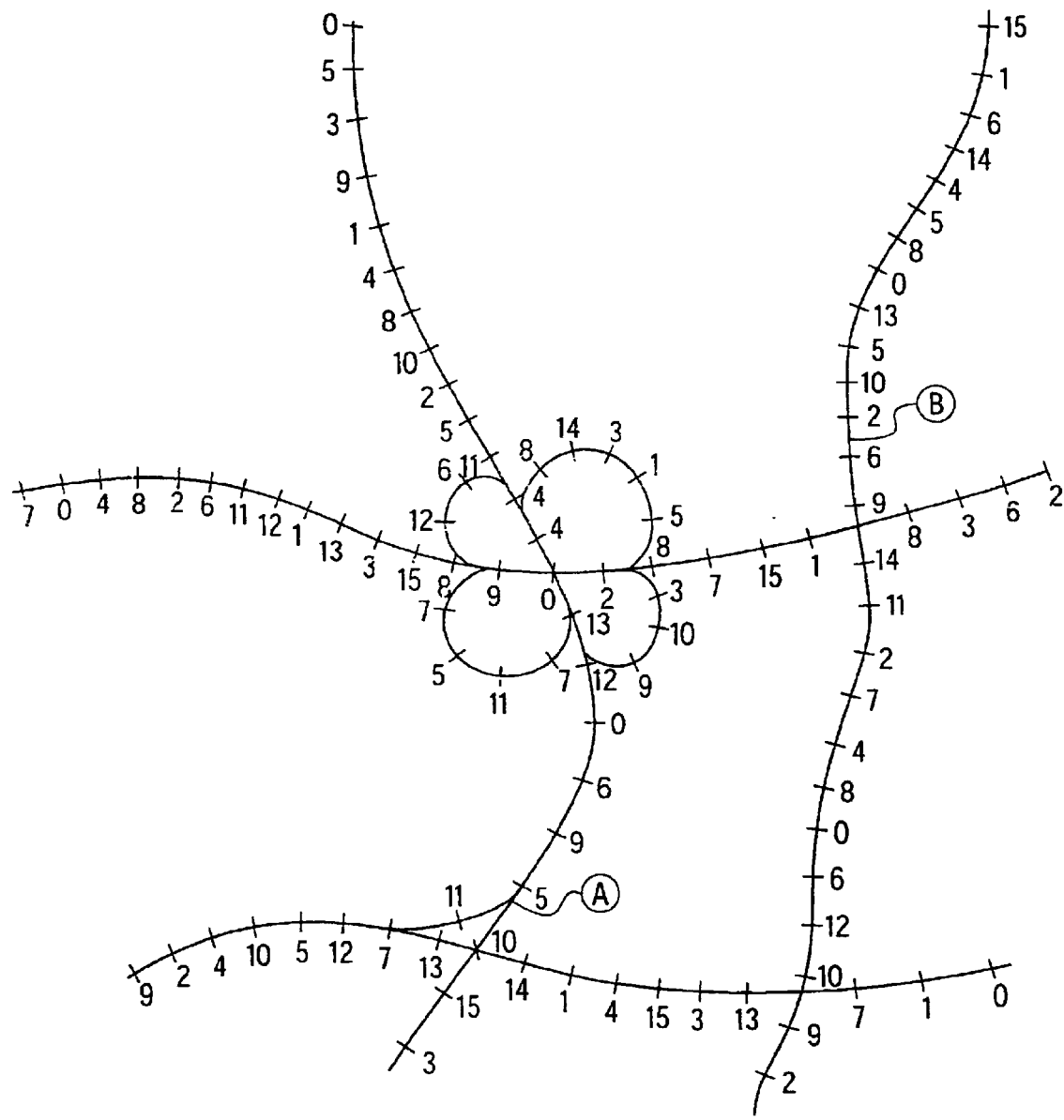

FIGS. 9A and 9B show a constrained path and free path environment, respectively, with 4 bit codes. As shown in FIG. 9A, if the interrogator system detects a series of transponder codes of 0. 6. 9. 5, the only consistent location within the environment is represented by A. Likewise, 5, 10, 2 is only consistent with location B. Thus, a relatively small number of transponder codes must be acquired before the position is localized.

As shown in FIG. 9B, in an open space, the analysis is somewhat more complicated. For example, it may be possible to remain distant from a transponder, thus misreading it. However, the gain of system can generally be increased so that, in a worst case, at least one signal can always be read. Directional antennas and timing differences may be used to distinguish between multiple transponders. To determine a location, a complete neighbor analysis must be performed, or additional navigational information provided, such as direction (inertial sensor 216, directional sensor 218, compass 224), distance (wheel rotation sensor 220), or coarse location (GPS 222).

In navigating through the environment, for example, the sequence 4, 8. 0, B defines the location C, in the $5^{th}$ column $5^{th}$ row, commencing in the $3^{rd}$ column, $3^{rd}$ row, heading right and then diagonally down. A search of the map reveals this to be the only instance of the string B, 0, 8, along any axis, and thus three codes would have been sufficient to localize the interrogator. If all the data available were the sequence 4, C, then an ambiguity would be present, either D1 in the $3^{rd}$ column, $8^{th}$ row, or $2^{nd}$ column, $3^{rd}$ row. Therefore, the location would be resolved unless the next code was a 1 ($3^{rd}$ column, $4^{th}$ row or $2^{nd}$ column, $7^{th}$ row), unless other data was supplied.

If a transponder code is missing or erroneously read, the map processor 200 will detect the error after a few more received codes, as an error or inconsistency, and store an entry in the exception map database 210. Thereafter (until flushed or reset), the map processor 200 will read the map exception database 210 data in preference (but not necessarily to the exclusion of) the map database 212 data. The map processor 200 may alternately perform a correlation of the sequence of received codes with the potential sequences represented in the map database 212 and exception map database 210, to determine a likelihood of identity. Where the correlation coefficient exceeds a threshold, which my be static or adaptive, a localization may be inferred.

The transponder system according to the present invention may advantageously be employed as part of an intelligent highway system. Therefore, the passive transponder units may be distributed along the roads as highway "dots". In this case, the transponder units are environmentally sealed, and have an internal antenna. An outer portion of the housing has a retroreflective structure, which improves visibility. The retroreflective structure may be, for example, a plastic plate having prismatic structures, or a paint having glass beads therein.

In an intelligent highway system, automobiles are outfitted with an interrogator and associated processor. Optionally, the navigational system may be integrated With a cellular telephone communications system. This cellular telephone system integration potentially allows pre-localization of the vehicle to within a five mile radius: and typically much smaller, based on an identification of proximate cellular antennas. The navigational system may also communicate through the cellular telephone link, but this is nor necessary. This communications network, however, may advantageously be used to communicate the raw data to a remote server, and return the exact location of the interrogator, or to synchronize the various mobile systems to include accurate geographical (localization) data. Thus, a central server with a dispersed communications network is provided.

Figure 9C:
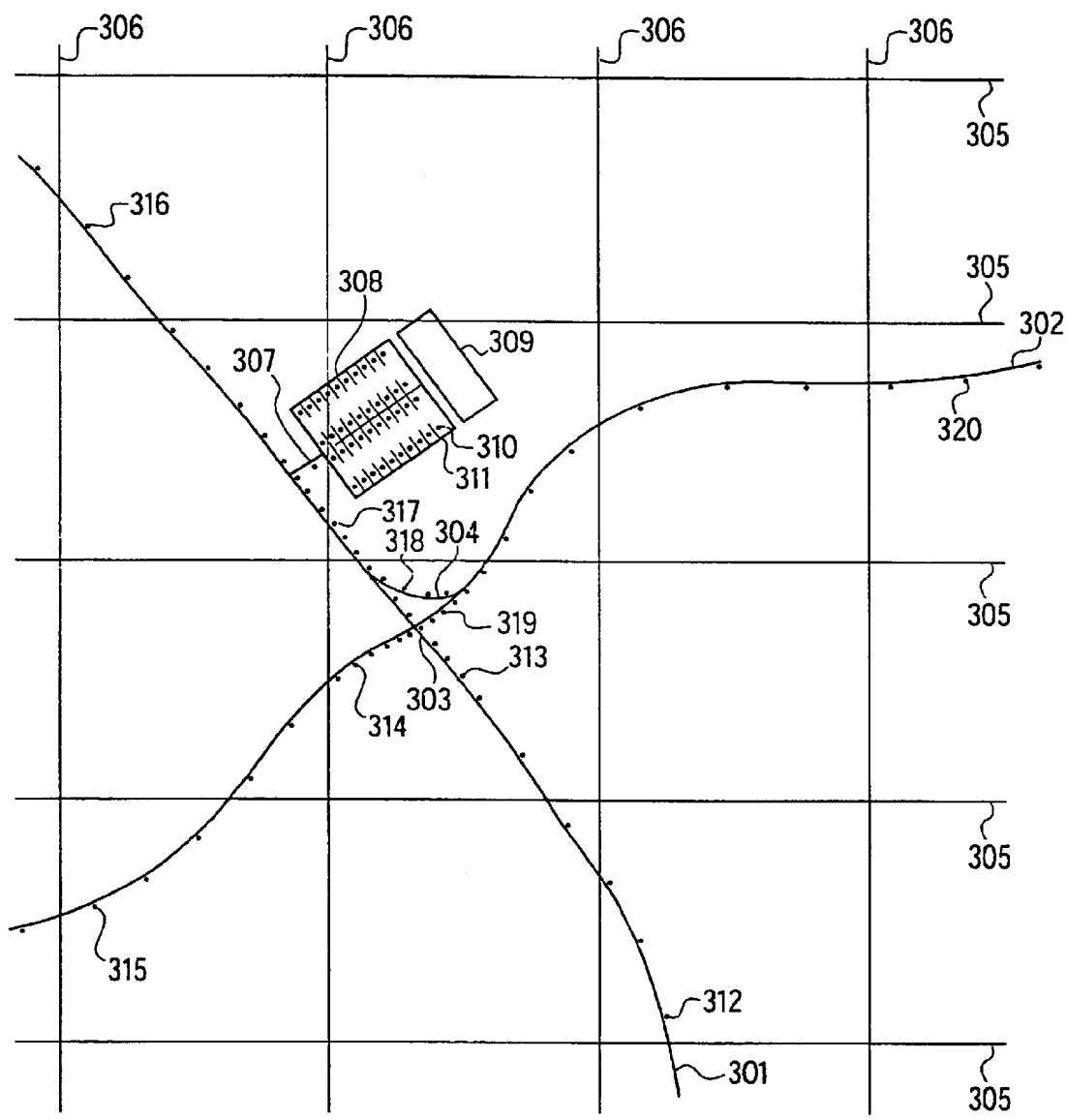
FIG. 9C shows a variable density identification code distribution.

FIG. 9C shows an intersection 303 of two roads 301, 302, with a traffic cutoff 304. The transponders are situated such that those closest 313, 314, 319, 318 to the intersection 303 are spaced at closer intervals than those further away 312, 315, 316, 320. Superimposed over the map are a set of grids, representing latitude and longitude as determinable by a GPS system. As can be seen, the accuracy of the GPS is insufficient to localize the receiver sufficient for navigation.

Off of road 301 is a building 309 with parking lot 308, connected by entrance 307. As shown in FIG. 9C, each parking space 311 within the parking lot may be designated by a different transponder 310. Thus, the density and arrangement of transponders may vary based on the environmental needs and desired positional resolution. In this embodiment, for example, each transponder may have, for example, an 8 bit code. While, within the scope of FIG. 9, there need not be any ambiguity in encoding with such a set of transponders, it is understood that the environmental localization space may extend far beyond the limits of the figure, and therefore ambiguities may occur over large distances. Therefore, even the relatively coarse GPS position determination 305, 306, may be sufficient to resolve any positional ambiguity. The maximum spacing of the transponders is not limited, except by the need for data. However, where the spacing exceeds the normal GPS resolution, e.g., 100 meters, then the GPS would likely be seen as the primary positioning system with the transponders and map locations, used for example, to provide a differential position correction for the GPS. The minimum spacing of transponders is limited by the selectivity of the interrogation system and availability of other fine-grained positioning systems. Typically, the spacing of transponders will be no closer that 10 centimeters, and more typically 2–10 meters.

As shown in FIG. 8, the microprocessor 200 communicate, through a communications system 260 having antenna 262. This communications system is, for example, a cellular radio device. A cellular base station 272, having antenna 270, communicates with the communications system 260. The cellular base station 272 is associated with an identification code 274, which may be transmitted. This identification code 274 is therefore also associated with the particular location of the cellular base station 272. The cellular base station 272 employs the IS-41 protocol, which provides for hand-offs between base stations for moving transceivers and other system administration functions. The cellular base station 277 communicates through a network "cloud" 278 with a server 280, having associated with it a database 282. Thus, it can be seen that the mapping information may be located in the mobile unit associated map database 212 or the server 280 associated database 282, or potentially both. The server 280 may directly resolve the location of the interrogation antenna 240, or it may download appropriate mapping references to through communications system 260 based on the received identification 274 of the cellular base station 272.

By analyzing the return signal for Doppler shift and the like, it is possible to determine the relative velocity of the vehicle and the transponder, which is typically stationary.

There has thus been shown and described a novel method for interrogating a passive acoustic wave transponder with a frequency hopping interrogation wave, and a method and system for analyzing a transponder signal therefrom. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of determining a location, comprising:
   (a) sensing proximity of a members of a set of landmarks;
   (b) storing sequential generic identifications of proximate landmarks, maintaining a sequence of sensing thereof, a single identification being insufficient to determine a location;
   (c) searching a database for locations consistent with the stored sequential identifications;
   (d) determining a likely location based on the search of the database.

2. The method according to claim 1, further comprising the step of remotely reading an identification from a landmark.

3. The method according to claim 1, further comprising the step of wirelessly reading an identification from a landmark.

4. The method according to claim 1, further comprising the steps of interrogating a landmark and receiving the non-unique identifier from a landmark in response to the interrogation.

5. The method according to claim 1, further comprising the steps of emitting an interrogation signal and receiving, in response to the interrogation signal, the non-unique identifier from a landmark.

6. The method according to claim 1, further comprising the steps of interrogating a landmark with a radio frequency signal, and receiving from the landmark a modified radio frequency signal.

7. The method according to claim 1, further comprising the steps of interrogating a landmark with a radio frequency signal, and receiving from the landmark a backscatter radio frequency signal comprising the identification.

8. The method according to claim 1, wherein said comparing comprises the steps of assuming an initial location, analyzing most recently received landmark identifications and comparing these to predetermined identifiers in a zone around the assumed prior position, and determining at least one consistent position.

9. The method according to claim 8, wherein, if a plurality of locations are consistent, a most likely location is output.

10. The method according to claim 8, wherein, if a plurality of locations are consistent, further landmark identifications are obtained until a unique consistent locations is defined.

11. The method according to claim 1, wherein the sequence of storing sequential generic identifications is statistically processed to increase tolerance to error in reading proximate identifications.

12. The method according to claim 1, wherein each of said landmarks comprises a surface acoustic wave passive backscatter radio frequency identification transponder.

13. The method according to claim 1, wherein at least two landmarks have the same identification.

14. The method according to claim 1, further comprising the step of implementing an error tolerant algorithm for determining a location in the event that one or more errors of the following types occur: proximity is erroneously sensed and the database is incorrect.

15. The method according to claim 1, wherein said searching comprises computing a correlation of stored sequential generic identifications and relationships with sets of geographically proximate landmark identifications within the database, to determine consistent corresponding locations in a fault tolerant manner.

16. The method according to claim 1, further comprising the steps of determining a landmark location using a secondary positioning system; and producing a composite location based on the determined likely location and the secondary positioning system.

17. The method according to claim 18, wherein said secondary positioning system comprises a geopositioning signal receiver.

18. The method according to claim 1, wherein the landmarks comprise lane boundary markers of a roadway, wherein the determined likely location is employed to assist in guidance of a vehicle.

* * * * *

UNITED STATES PATENT AND TRADEMARK OFFICE
CERTIFICATE OF CORRECTION

PATENT NO. : 6,775,616 B1
APPLICATION NO. : 10/646140
DATED : August 10, 2004
INVENTOR(S) : Paul A. Nysen It is certified that error appears in the above-identified patent and that said Letters Patent is hereby corrected as shown below:

In column 2 line 40, replace "alone" with -- along --.

In column 7 line 12, replace "132" with -- 182 --.

In column 7 line 20, replace "184" with -- 188 --.

In column 12 line 65, replace "alone" with -- along --.

In column 14 line 33, replace "128" with -- 125 --.

In column 15 line 36, replace "51" with -- S1 --.

In column 15 line 40, replace "32" with -- S2 --.

In column 16 line 16, replace "never" with -- mixer --.

In column 16 line 40, replace "decree" with -- degree --.

In column 19 line 37, replace "277" with -- 272 --.

Signed and Sealed this

Twenty-sixth Day of February, 2008

JON W. DUDAS
*Director of the United States Patent and Trademark Office*